(12) United States Patent
Harada

(10) Patent No.: US 6,657,615 B2
(45) Date of Patent: *Dec. 2, 2003

(54) INPUT PROCESSING METHOD AND INPUT PROCESSING DEVICE FOR IMPLEMENTING SAME

(75) Inventor: Tomoki Harada, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/539,442
(22) Filed: Mar. 30, 2000
(65) Prior Publication Data
US 2003/0122774 A1 Jul. 3, 2003

(30) Foreign Application Priority Data

Sep. 10, 1999 (JP) .............................. 11-257640

(51) Int. Cl.⁷ ................................................ G09G 5/00
(52) U.S. Cl. ........................ 345/173; 345/157; 345/684
(58) Field of Search ................................. 345/173, 156, 345/157, 179, 159, 160, 684; 178/18.01, 19.01

(56) References Cited

U.S. PATENT DOCUMENTS

| | | | |
|---|---|---|---|
| 5,404,458 A | 4/1995 | Zetts | 395/275 |
| 5,764,218 A | 6/1998 | Della Bona et al. | 345/157 |
| 5,781,181 A * | 7/1998 | Yanai et al. | 345/173 |
| 6,107,997 A * | 8/2000 | Ure | |
| 6,208,329 B1 * | 3/2001 | Ballare | 345/173 |
| 6,266,050 B1 * | 7/2001 | Oh et al. | |
| 6,380,929 B1 * | 4/2002 | Platt | |

FOREIGN PATENT DOCUMENTS

| | | |
|---|---|---|
| EP | 0698845 A1 | 2/1996 |
| GB | 2319591 A | 5/1998 |
| JP | 5-241506 | 9/1993 |
| JP | 2502050 | 6/1996 |
| JP | 11-45141 | 2/1999 |
| JP | 11-53115 | 2/1999 |

* cited by examiner

Primary Examiner—Regina Liang
(74) Attorney, Agent, or Firm—Staas & Halsey LLP

(57) ABSTRACT

A plurality of mouse input operations are switched according to the touching time period against a touch panel. Therefore, it is possible to carry out processing corresponding to a plurality of mouse input operations, selectively, by means of a single input operation, namely, a touch input operation, thereby improving the ease of operation. Furthermore, in the present invention, the direction of scrolling of a screen can be switched according to the touching time period against a touch panel. Consequently, it is possible to perform upward scrolling and downward scrolling, selectively, for example, by means of a single input operation, namely, a touch input operation, thereby improving the ease of operation.

14 Claims, 8 Drawing Sheets

INPUT PROCESSING METHOD AND INPUT PROCESSING DEVICE FOR IMPLEMENTING SAME

BACKGROUND OF THE INVENTION

1. Field of the Invention

The present invention relates to an input processing method for a touch input device for processing touch input operations by touching against a screen, an input processing device for implementing same, and an information processing apparatus provided with same.

2. Description of the Related Art

In some information processing apparatuses, such as personal computers (including notebook-type personal computers,) a touch input device, such as a tablet, digitizer, or the like, is used as an input device in place of a mouse. In general, a tablet or digitizer is located above or below a monitor screen, such as a CRT, liquid-crystal display, or the like, and it senses the position at which a pointing device, such as a pen, or the like, makes touching with the screen. If these elements are integrated with the screen, then the device is called a touch panel or touch screen.

More specifically, a pressure-sensitive tablet is a resistance film made from a transparent electrode, which is affixed to the surface of the monitor screen. The position of touching of the pen is detected by measuring the electric potential created by the touching of the pen dividing the resistance of the film. Moreover, an electromagnetic induction tablet is located below the screen, and it detects the position of touching of the pen by detecting the magnetism generated by the pen tip. As a method for detecting the point of touching, in addition to a pressure-sensitive tablet or electromagnetic induction tablet, a variety of other methods have been achieved, for instance, a method which utilizes ultrasonic waves, such as an ultrasonic surface elastic wave touch panel, or the like.

Conventionally, processing corresponding to a left click on a mouse, such as indicating the position of a pointer (or cursor) on the screen, selecting menus by operating icons, starting up software, or the like, is assigned to input operations using these touch input devices. On the other, in recent years, various devices for processing input operations corresponding to processing other than a left click have been proposed.

For example, the map display device disclosed in Japanese Patent Laid-open No. (Hei) 5-241506 has a function for changing the scale of a map displayed on a screen, according to the time period for which a touch panel is pressed. Moreover, the input device disclosed in Japanese Patent Laid-open No. (Hei) 11-53115 has a function for moving a cursor on a screen by means of a touch input operation. Specifically, the device switches between a method whereby movement commands are input by moving an input pen, or the like, while pressing it against a touch panel, thereby causing a cursor to move relatively with respect to movement of the pen, and a method whereby movement commands are input by pressing the pen against a desired position on the touch panel for a desired period of time, thereby causing a cursor to move in the direction of the position where the panel is pressed, at a speed corresponding to the distance from the cursor to the desired position, selectively, according to the period of time for which the pen is pressed against the panel. Moreover, the data input device disclosed in Japanese Patent Laid-open No. (Hei) 11-45141 comprises a function for identifying input operations when a touch panel is pressed for a prescribed period of time or more, in order to prevent incorrect input operations.

When a touch input is used in place of a mouse-based input, preferably, processing corresponding to the right click of a mouse should be assigned to the touch input operation. Moreover, in recent years, mouse devices provided with a middle switch or wheel between left switch (for left click operation) and right switch (for right click operation) have become common. Therefore, preferably, processing corresponding to click operations of the middle switch or wheel (hereinafter, called a middle click) are assigned also. In particular, since scroll processing is often assigned to the middle click operation (including rotation of the wheel), preferably, scroll processing should also be realized by means of a touch input operation.

SUMMARY OF THE INVENTION

Therefore, it is an object of the present invention to provide an input processing method for carrying out processing corresponding to a plurality of mouse input operations by means of touch input operations, an input processing device for implementing same, and an information processing apparatus provided with same.

In order to achieve the aforementioned object, in the present invention, a plurality of mouse input operations are switched according to the touching time period against a touch panel. Therefore, it is possible to carry out processing corresponding to a plurality of mouse input operations, selectively, by means of a single input operation, namely, a touch input operation, thereby improving the ease of operation.

Furthermore, in the present invention, the direction of scrolling of a screen can be switched according to the touching time period against a touch panel. Consequently, it is possible to perform upward scrolling and downward scrolling, selectively, for example, by means of a single input operation, namely, a touch input operation, thereby improving the ease of operation.

Preferably, the first input processing method according to the present invention is an input processing method for processing touch input operations to a screen, comprising a detecting step for detecting a touching time period against the screen, and a selecting step for selecting one of a plurality of processes corresponding to mouse input operations according to the detected touching time period. The plurality of processes corresponding to the mouse input operations includes, for example, a process corresponding to a left click and a process corresponding to a right click in the aforementioned mouse input operations. Moreover, a process corresponding to a middle click may also be included.

Furthermore, preferably, the second input processing method according to the present invention is an input processing method for processing touch input operations to a screen, comprising a step for detecting a touching time period against a screen, and a selecting step for selecting either a scrolling process in a first direction or a scrolling process in a second direction on the screen according to the detected touching time period. For example, the aforementioned first and second directions are, respectively, an upward direction and downward direction.

Moreover, preferably, the third input processing method according to the present invention is an input processing method for processing touch input operations to a screen, comprising a step for detecting a touching time period against the screen, and a selecting step for selecting either a process corresponding to one of mouse input operations or a screen scrolling process according to the detected touching time period.

For example, the selecting step in the aforementioned third input processing method selects the direction of scrolling on the screen according to the detected touching time period. Moreover, the process corresponding to one of mouse input operations is a process corresponding to a left click in the aforementioned mouse input operations. Furthermore, the aforementioned input processing method may also comprise a display step for changing an icon displayed on the screen, while the screen is being touched, each time that the process selected in accordance with the touching time period changes.

Moreover, according to the present invention, an input processing device for implementing the aforementioned input processing method, an information processing apparatus provided with same, and a storage medium for storing programs for implementing the aforementioned input processing method, are provided.

DESCRIPTION OF THE PREFERRED EMBODIMENTS

Below, embodiments of the present invention are described. However, the technical scope of the present invention is not limited to these embodiments.

Figure 1:
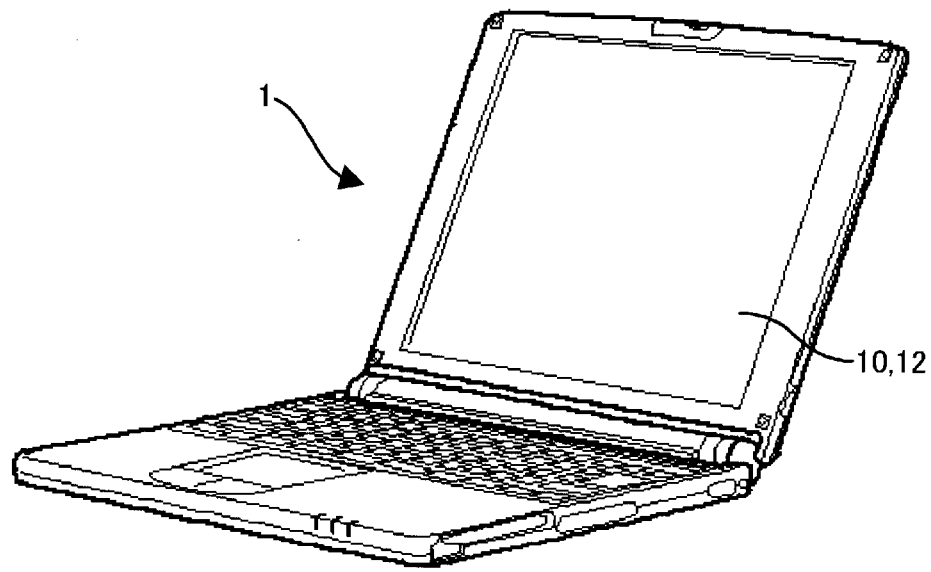
FIG. 1 is an oblique view of an information processing apparatus in which an input processing method according to an embodiment of the present invention is applied.

FIG. 1 is an oblique diagram of an information processing apparatus to which an input processing method according to an embodiment of the present invention is applied. In FIG. 1, a notebook personal computer 1 is depicted as one example of an information processing apparatus. The notebook personal computer 1 comprises a liquid crystal display 12, and a touch panel (tablet) 10 forming a touch input device is superimposed on the liquid crystal display 12.

Figure 2:
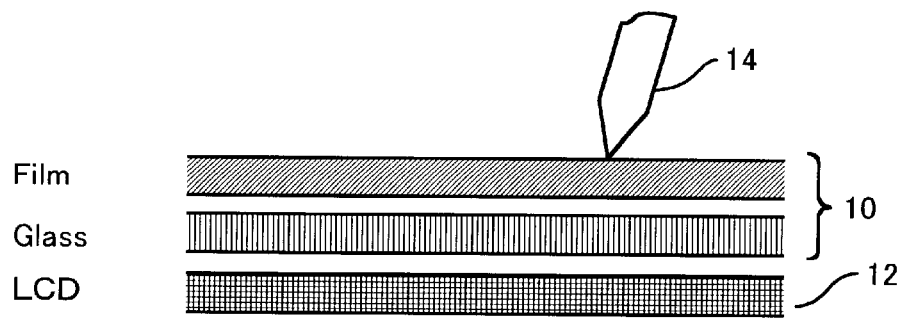
FIG. 2 is a diagram for describing a pressure-sensitive tablet and electromagnetic induction tablet.
Figure 2:
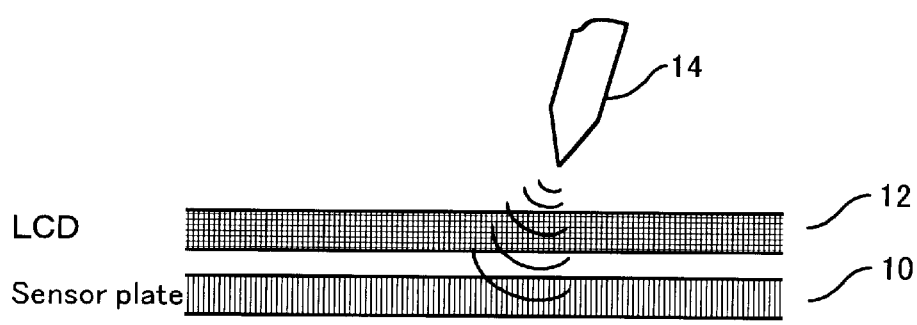

FIG. 2A is a diagram for describing a pressure-sensitive touch panel and FIG. 2B is for an electromagnetic induction touch panel. In FIG. 2A, a pressure-sensitive touch panel is constituted by a transparent film and glass, and is positioned over the liquid crystal display 12. When a pen 14, or the like, is pressed against the film, such that the film and glass make touching, the resistance value thereof changes. The point of touching is detected on the basis of this resistance value. In FIG. 2B, the electromagnetic induction touch panel is comprised of a sensor plate having a sensor coil, which is located below the liquid crystal display 12. The position of the pen 14 is detected by detecting the magnetic force generated by the tip of the pen 14, by means of the sensor coil.

Figure 3:
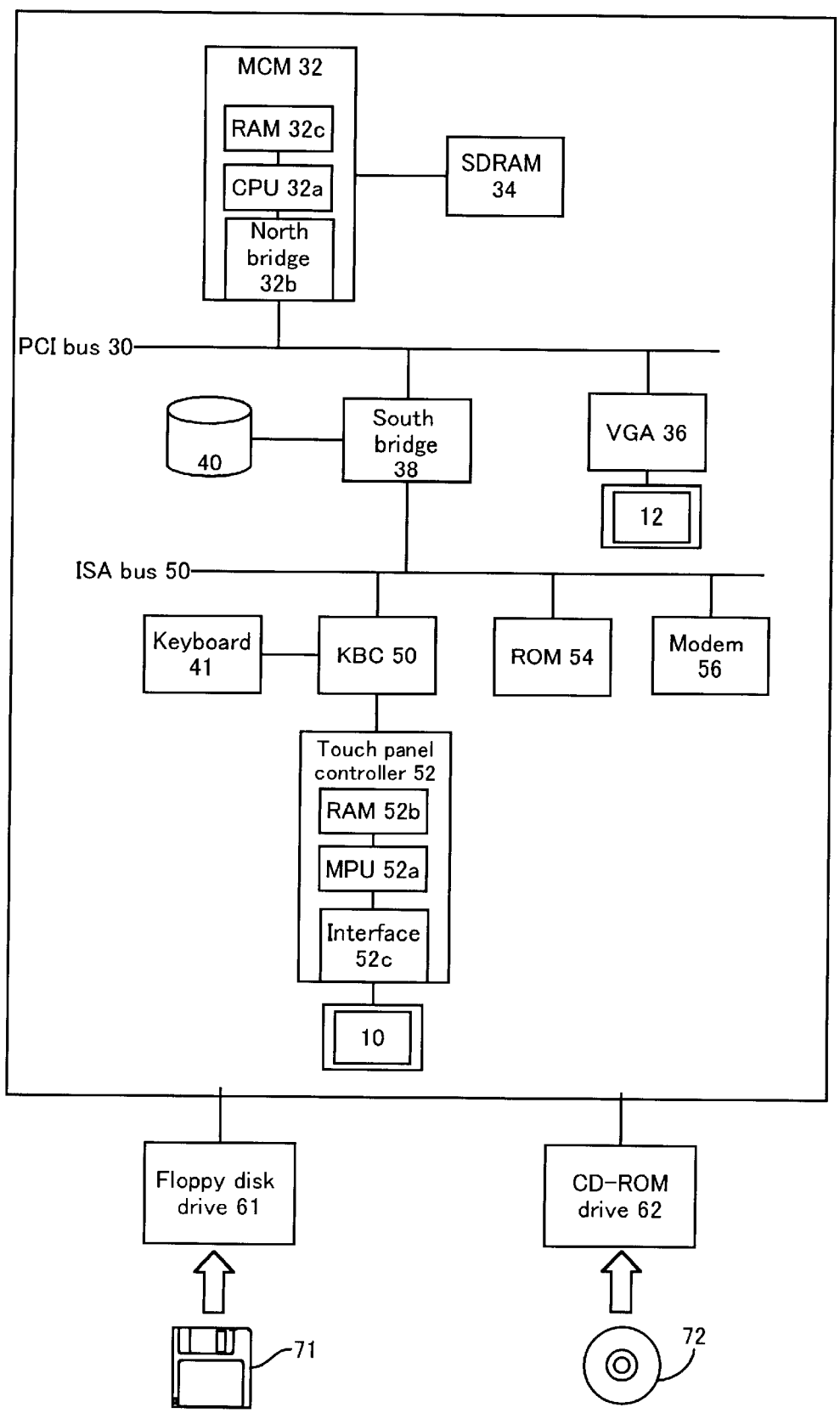
FIG. 3 is a block composition diagram of the information processing apparatus in FIG. 1.

FIG. 3 is a block composition diagram of the information processing apparatus 1 in FIG. 1. A multi-chip module (MCM) 32, south bridge 38 and video graphics array (VGA) controller 36 are connected to a PCI (Peripheral Component Interconnect) bus 30. Furthermore, a south bridge 38, keyboard controller (KBC) 51, ROM (Read Only Memory) 54 and modem 56 are connected to an ISA (Industry Standard Architecture) bus 50. Moreover, the south bridge 38 is connected to a hard disk drive (HDD) 40 forming an auxiliary memory device, which controls writing and reading of data to and from the HDD 40. The HDD 40 stores a program for implementing the input processing method according to the present invention, which is described hereinafter. Moreover, a keyboard 41 and a touch panel controller 52 are connected to the keyboard controller 50.

The multi-chip module 32 comprises a CPU 32a, north bridge 32b, and secondary cache memory (RAM) 32c. The multi-chip module 32 is also connected to a SDRAM (synchronous DRAM) 34 forming a main memory. The SDRAM 34 operates in synchronization with the system bus clock. The north bridge 32b is a PCI system controller for controlling data communication between the CPU 32a, secondary cache memory 32c, main memory 34, PCI bus, and the like.

Moreover the south bridge 38 is a bridge for connecting the PCI bus 30 and ISA bus 50, and it controls data communication between the PCI bus 30 and ISA bus 50. Moreover, the VGA controller 36 controls the liquid crystal display 12 according to VGA standards.

The touch panel controller 52 comprises an MPU 52a, memory (RAM) 52b and interface circuit 52c, and it controls touch input operations by means of the touch panel 10. When the system is started up, a program for carrying out the input processing method according to the present invention as stored in the HDD 40 (program illustrated in the flowcharts in FIGS. 4, 6, 8 and 9) is loaded into the memory 52a or SDRAM 34, and implemented by the MPU 52a and CPU 32a. Moreover, the ROM 54 stores an initial program loader.

Furthermore, in order to connect with peripheral devices of various types, the information processing apparatus 1 is provided with a serial port, parallel port, communications port, CRT connector, mouse connector, FDD adapter for connecting to a floppy disk drive (FDD) 61, and the like. The floppy disk drive 61 may be provided inside the information processing apparatus 1. Moreover, the information processing apparatus 1 is provided with a CD-ROM drive adapter, and may be connected to a CD-ROM drive 62. The CD-ROM drive 62 may be provided inside the information processing apparatus 1.

A program for implementing the input processing method according to the present invention may be stored on a transportable storage medium, such as a floppy disk 71, CD-ROM 72, or the like, and this program may be supplied to the information processing apparatus 1 by means of an FDD drive 61, CD-ROM drive 62, or the like. Moreover, the program may also be supplied by means of a communications circuit connected to the modem 56.

Figure 4:
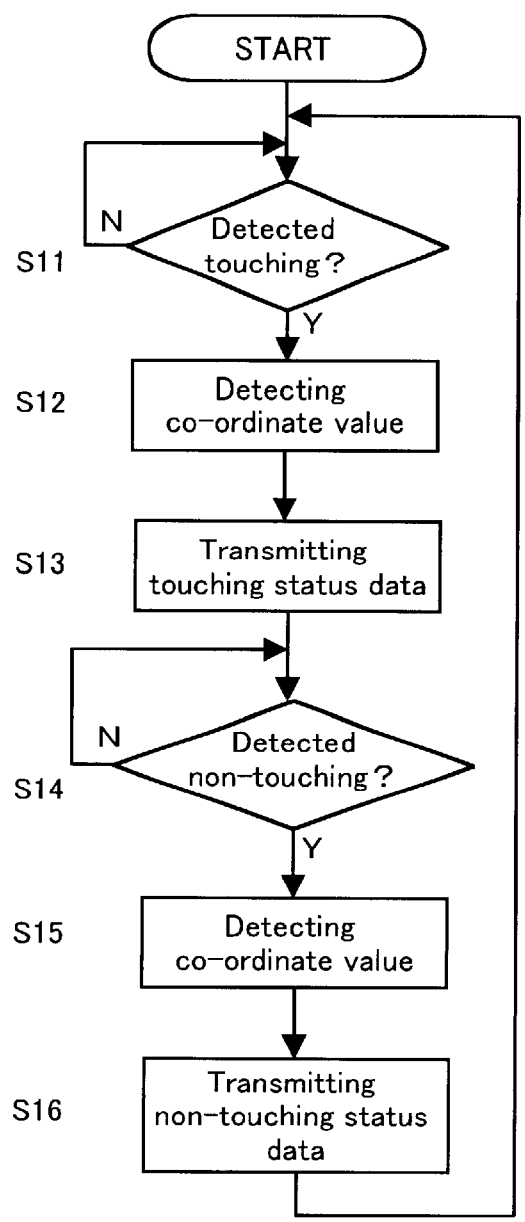
FIG. 4 is a processing flowchart for an MPU 52a implementing an input processing method according to an embodiment of the present invention.

FIG. 4 is a processing flowchart for the MPU 52a which implements the input processing method according to this embodiment of the present invention, and it depicts a flowchart of the program executed by the MPU 52a. Firstly, at step S11, if the MPU 52a detects that the pen is in touching with the touch panel 10, then at step S12, the point of touching of the pen is detected in the form of an X co-ordinate value and Y co-ordinate value for an XY co-ordinate system set on the touch panel 10. At step S13, the MPU 52a generates touching status data, as illustrated later with reference to FIG. 5(a), and this data is transmitted to the CPU 32a.

Figure 5:
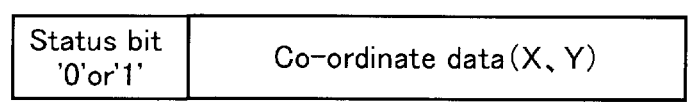
FIG. 5 is a diagram illustrating an example of status data.

FIG. 5 is a diagram showing an example of status data. Status data comprises a flag for identifying a touching state and a non-touching state, the flag being set to a status bit of '1' in the case of a touching state, and the flag being set to a status bit of '0' in the case of a non-touching state. Hereinafter, status data where the flag is set to '1' will be called 'touching status data', and status data where the flag is set to '0' will be called 'non-touching status data'. In addition, the XY co-ordinate values at which the touching status or non-touching status was detected are specified as co-ordinate data.

Returning to FIG. 4, at step S14, if the MPU 52a detects a non-touching state between the pen and the touch panel 10, then at step S15, the point of touching of the pen is detected in terms of an X co-ordinate value and Y co-ordinate value of the XY co-ordinate system set on the touch panel 10. Thereupon, at step S16, the MPU 52a generates non-touching status data as in FIG. 5 described above, and transmits this data to the CPU 32a.

Figure 6:
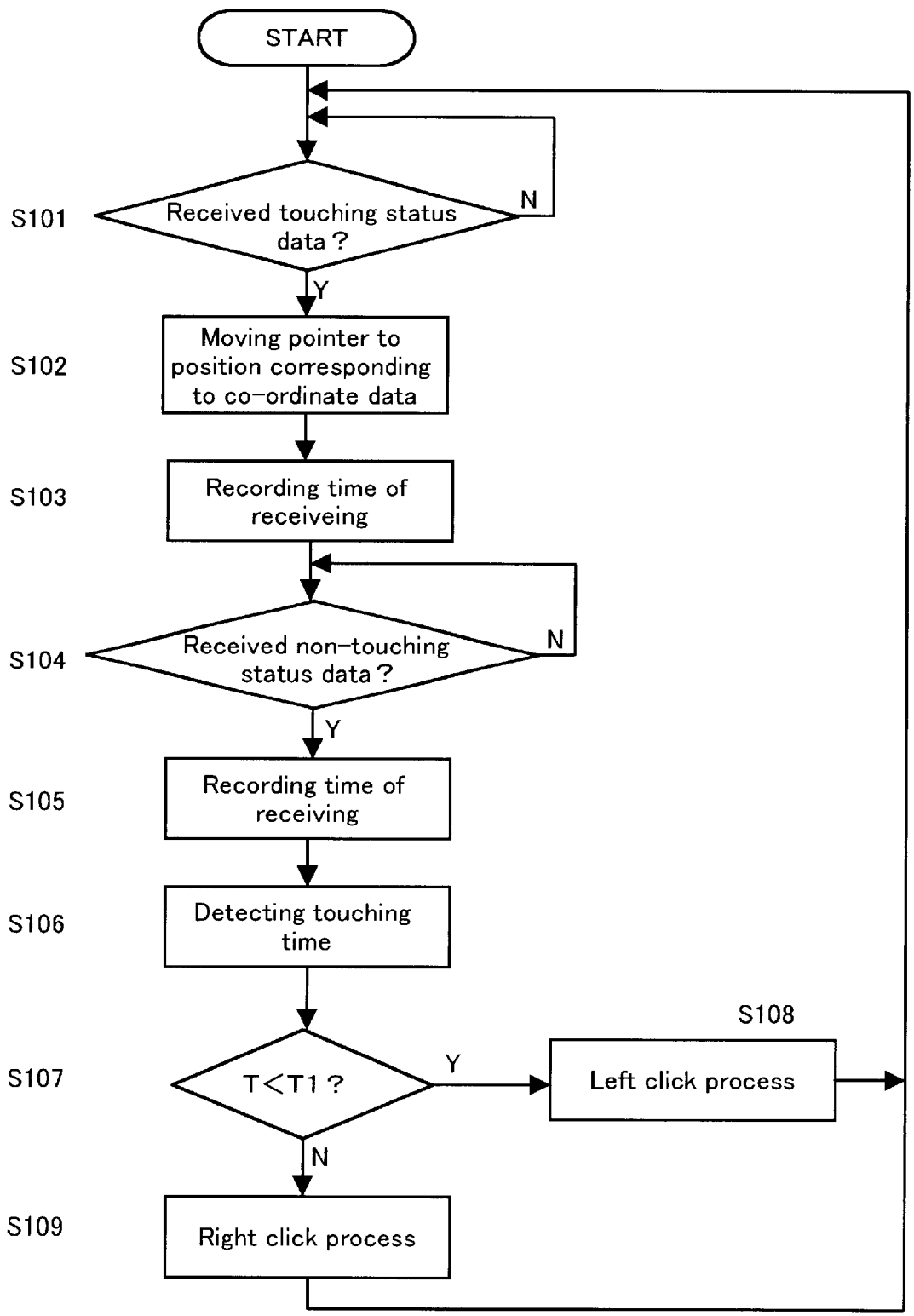
FIG. 6 is a first processing flowchart for a CPU 32a implementing an input processing method according to an embodiment of the present invention.

FIG. 6 is a first processing flowchart for the CPU 32a when implementing the input processing method according to this embodiment of the present invention, and it depicts the program executed by the CPU 32a. This program is executed by being loaded into the system memory SDRAM 34 from the HDD 40. In the first processing sequence, the CPU 32a executes left click processing and right click processing, selectively, according to the period of time for which the pen is in touching with the touch panel 10. Firstly, at step S101, if the CPU 32a receives touching status data from the MPU 52a of the touch panel controller 52, then at step S102, the pointer is moved to a position corresponding to the co-ordinates data contained in the touching status data, and the timing at which this data is received is recorded in the SDRAM 34 (step S103). The timing at which the status data is received is measured by using the system clock provided inside the information processing apparatus.

Moreover, at step S104, if the CPU 32a receives non-touching status data from the MPU 52a, then at step S105, the timing at which this data is received is also recorded in the SDRAM 34. Moreover, at step S106, the CPU 32a detects the touching time period T from the difference between the respective timings at which the touching status data and non-touching status data was received. The CPU 32a executes left click processing and right click processing, selectively, in accordance with the touching time period T thus detected. In other words, at step S107, if the touching time period T is less than a first time period T1, then left click processing is selected (step S108), and if the touching time period T is equal to or more than the first time period T1, then right click processing is selected (step S109).

The processing corresponding to a left click involves, for example, specifying the position of a pointer or cursor displayed on a screen, selecting a menu by controlling an icon, or starting up a software application, or the like. The processing corresponding to the right click varies depending on the application program being executed, and it may involve, for example, displaying an operational menu at the position of the pointer or cursor, or the like.

Figure 7A:
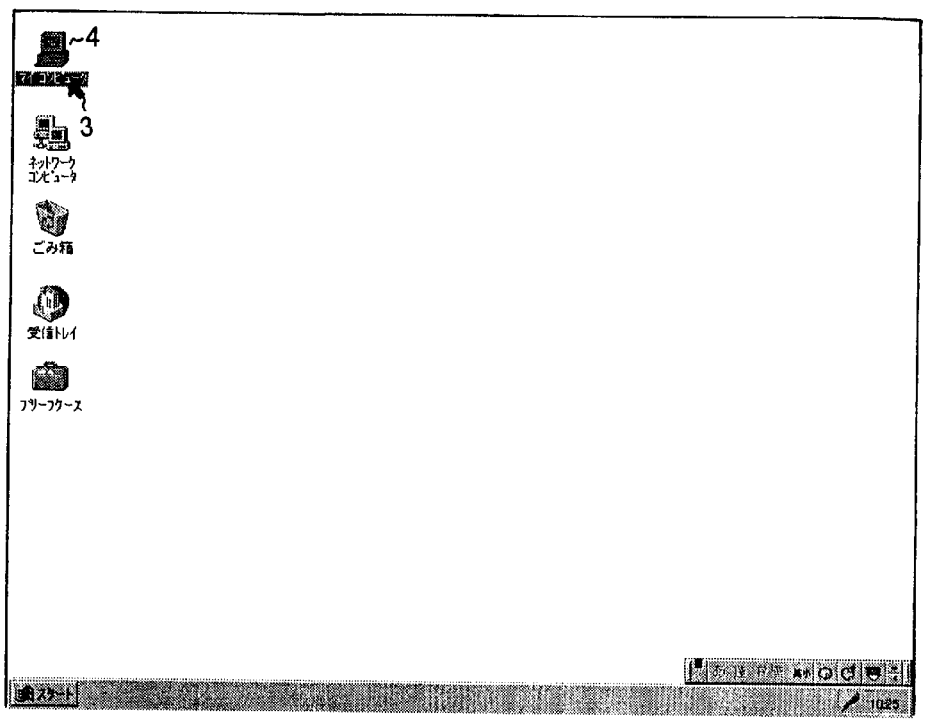
FIGS. 7A, 7B give examples of a screen shown on a display 12.
Figure 7B:
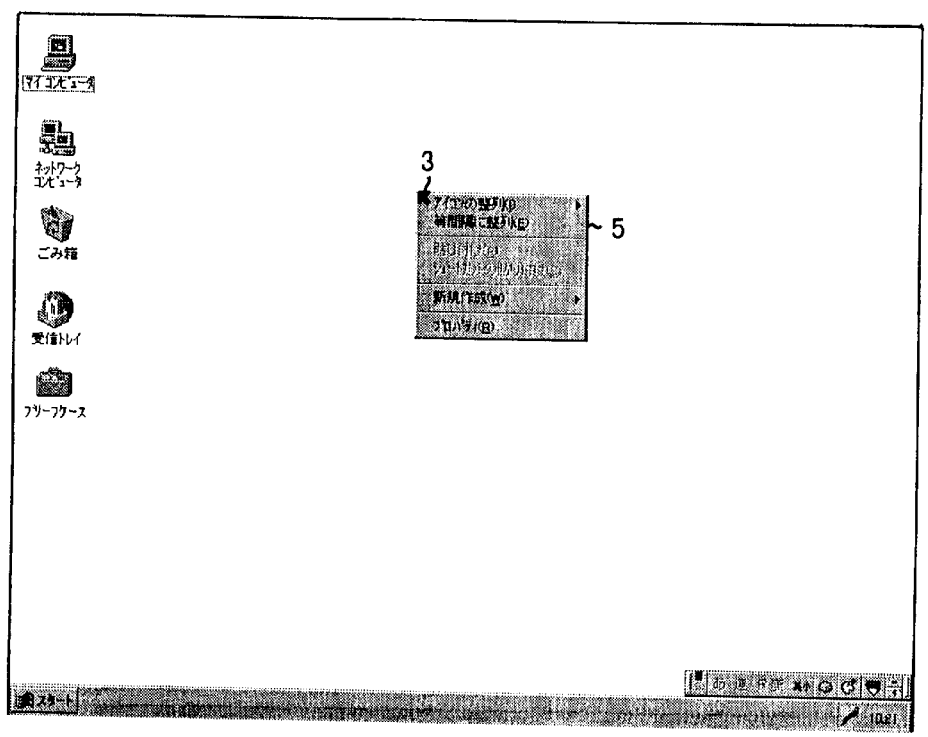

FIGS. 7A and 7b are examples of a screen displayed on a display device. FIG. 7A is an example of a screen in a case where left click processing is executed, and FIG. 7B is an example of a screen in a case where right click processing is executed. FIG. 7A shows a case where a pointer 3 is moved to the top left of a screen and an icon 4 in that position is selected, by means of left click processing. FIG. 7B shows a case where an operational menu 5 is displayed at the position of the pointer 3, by means of right click processing.

In this way, according to the first processing sequence, it is possible to implement a left click operation and a right click operation of a mouse, selectively, by means of a single touch input operation. In other words, it is possible to execute a plurality of input operations selectively by means of a single input operation. Therefore, it becomes possible to execute all operations conducted by a mouse by means of a touch input operation, without using a mouse, thereby causing ease of operation to be improved markedly.

Moreover, in order to correspond to a mouse having a middle switch (wheel) in addition to a left switch and a right switch, in FIG. 7 described above, processing may also be added whereby a second time period T2 (where T2>T1) is set, and if the touching time period T is equal to or greater than this second time period, then processing corresponding to a middle click is selected.

Furthermore, the order in which processing sequences are selected according to the length of the touching time period is not limited to that described above. For example, the order may be devised in such a manner that if the touching time period T is less than the first time period T1, then right click processing is selected and if it is equal to or greater than the first time period T1, then left click processing is selected.

Figure 8:
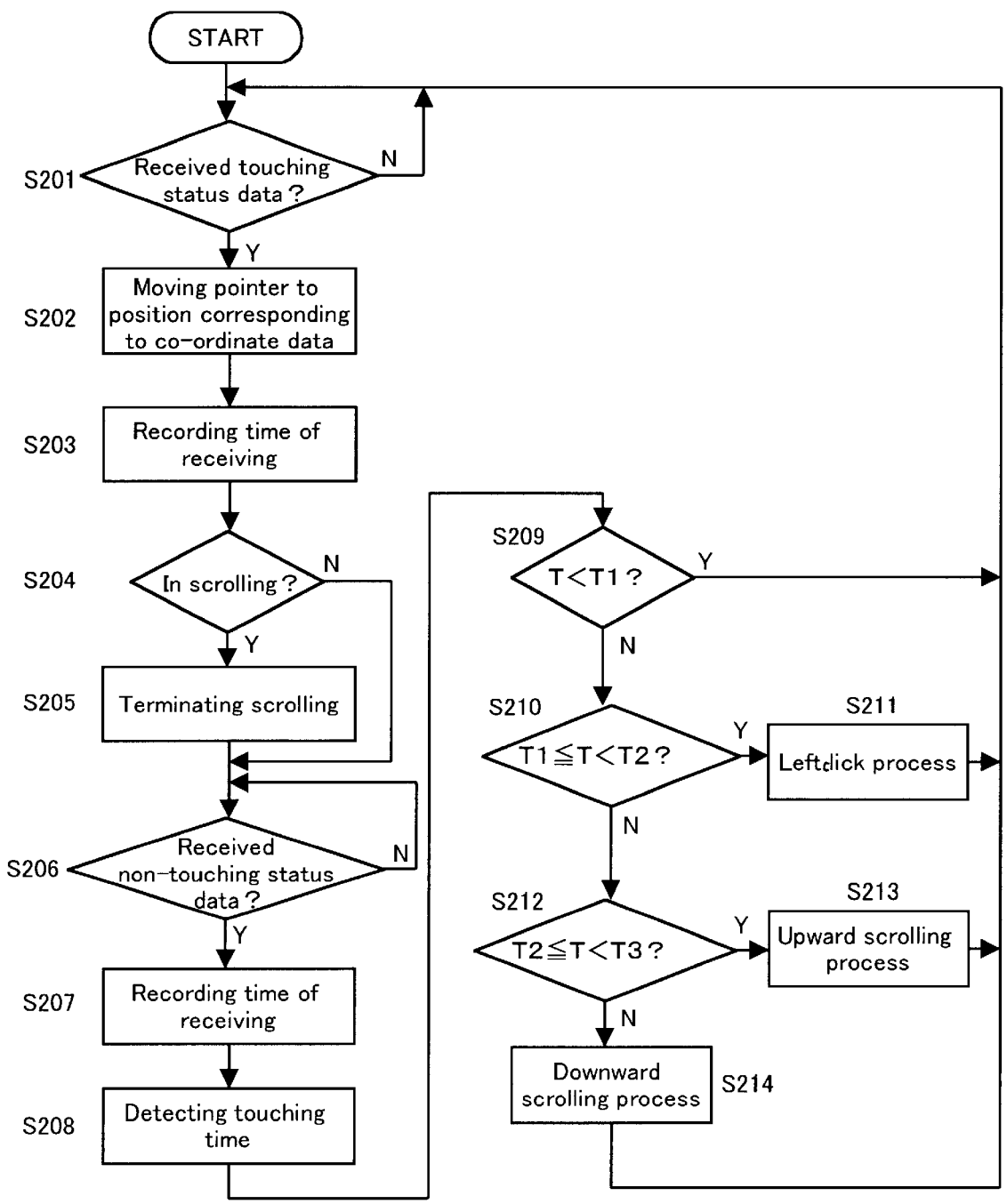
FIG. 8 is a second processing flowchart for a CPU 32a implementing an input processing method according to an embodiment of the present invention.

FIG. 8 is a second processing flowchart for the CPU 32a when executing an input processing method according to this embodiment of the present invention, and it depicts a program executed by the CPU 32a. This program is executed by loading it from the HDD 40 into the system memory SDRAM 34. In the second processing sequence, the CPU 32a executes left click processing and scroll processing, selectively, in accordance with the touching time period of the pen against the touch panel 10. Firstly, at step S201, if CPU 32a receives touching status data from the MPU 52a of the touch panel controller 52, then at step S202, the pointer is moved to a position corresponding to the co-ordinates data contained in the touching status data, and the timing at which this data is received is recorded in the SDRAM 34 (step S203).

Moreover, at step S204, the CPU 32a determines whether or not the screen is currently in a scrolling operation, and if it is in a scrolling operation, then at step S205, the scrolling operation is terminated.

At step S206, if the CPU 32a receives non-touching status data from the MPU 52a, then at step S207, the timing at which this data is received is recorded in the SDRAM 34. Further, at step S208, the CPU 52a detects the touching time period T from the difference between the respective timings at which the touching status data and non-touching status data is received. The CPU 52a executes left click processing and scroll processing, selectively, in accordance with the touching time period T thus detected. Specifically, at step S209, if the touching time period T is less than a first time period T1, no processing is executed. In other words, at step S202, the pointer or cursor is only moved to the touching position. In this way, processing whereby only movement of the pointer or cursor is carried out when the screen is touched may also be included.

At step S210, if the touching time period T is greater than the first time period T1 and less than a second time period T2 (where T2>T1), then left click processing is selected (step S211). Moreover, at step S212, if the touching time period T is greater than the second time period T2 and less than a third time period T3 (where T3>T2), then upward scroll processing for scrolling the screen in an upward direction is selected (step S213), and if the touching time period T is equal to or greater than a third time period T3, then downward scroll processing for scrolling the screen in a downward direction is selected (step S214).

In this way, according to the second processing sequence described above, it is possible to implement left click processing and scroll processing based on a mouse, selectively, by means of a single touch input operation. Moreover, with respect to scroll processing, it is possible to carry out upward scroll processing and downward scroll processing, selectively, depending on the length of the touching time period. Therefore, it is possible to implement a plurality of processing sequences by means of a single, simple operation, namely, a touch input operation, thereby dramatically improving ease of operation.

In a case where the device corresponds to a mouse having a middle switch (wheel), if middle click processing is not related to scroll processing, then in FIG. 8 above, processing may be added whereby a fourth time period T4 (where T4>T3) is set, and if the touching time period T is greater than the fourth time period, then processing corresponding to a middle click is selected.

Moreover, in the case of FIG. 8, the order in which processing is selected according to the length of the touching time period is not limited to that described above. For example, the order of the downward scroll processing and upward scroll processing may be reversed.

As described above, in the embodiment of the present invention, a plurality of processing sequences are implemented, selectively, according to the touching time period of a touch input operation. In other words, the processing selected changes while touching is made with the touch panel. Therefore, preferably, it should be possible for the user to identify the processing that is to be selected according to the touching time period. For this purpose, the icon display of the pointer and cursor may be changed according to the touching time period. Thereby, the user is able to identify the processing that is to be selected when the pen returns to a non-touching state.

Figure 9:
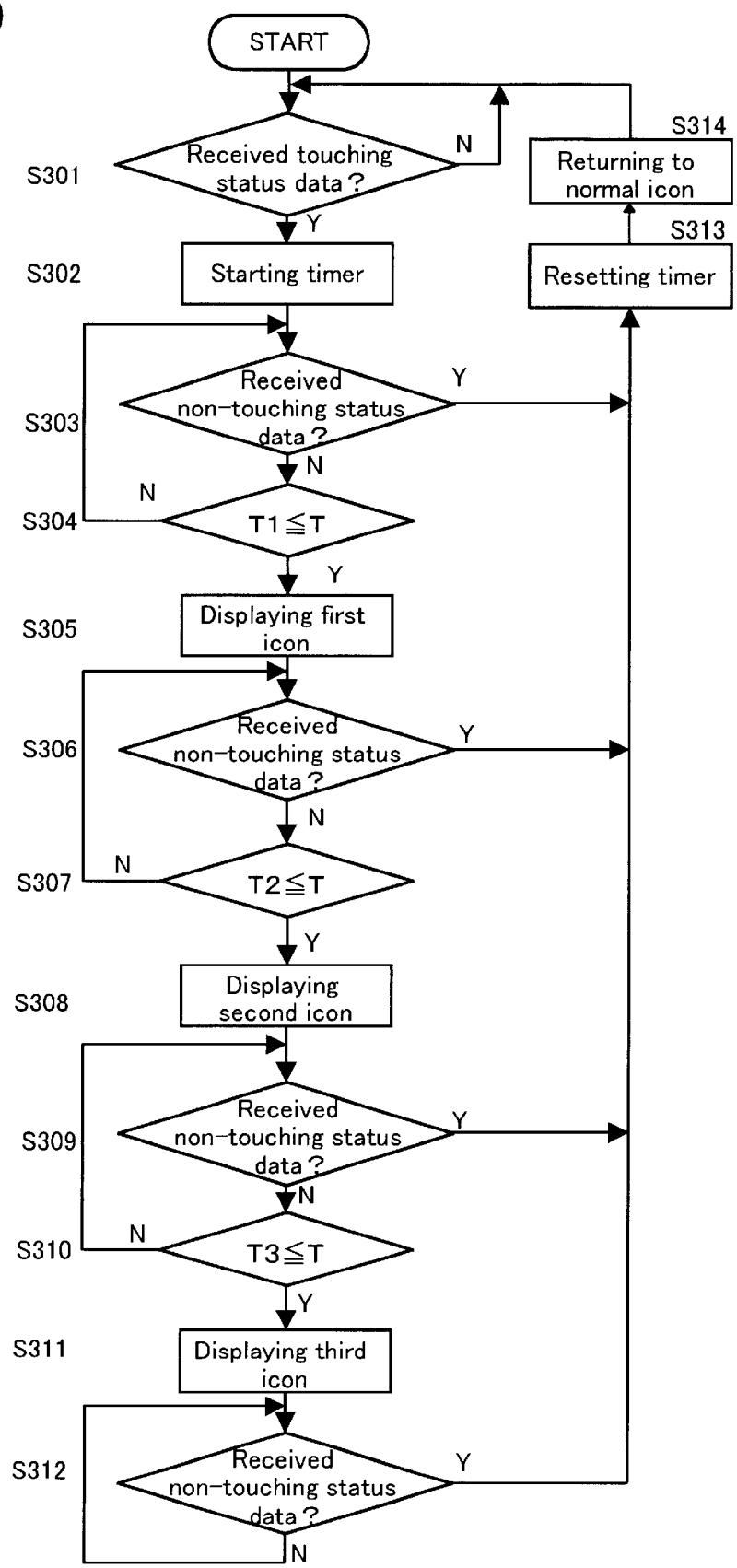
FIG. 9 is a processing flowchart for changing the display of a pointer icon corresponding to the processing in FIG. 8.
Figure 10A:
FIGS. 10A–10F are diagrams showing examples of pointer icons.

FIG. 9 is a processing flowchart for changing the icon display of a pointer in accordance with the processing in FIG. 8, and it depicts the program executed by the CPU 32a. This program is executed by being loaded from the HDD 40 into the system memory SDRAM 34. Furthermore, FIG. 10 is a diagram illustrating an example of a pointer icon. As shown in FIG. 10A, normally, the pointer icon has, for example, an arrow shape pointing in an upward and leftward direction. At step S301 in FIG. 9, if the CPU 32a receives touching status data, then at step S302, a timer is started, using a timer function of the system clock. The timer measures the period of time T that has elapsed since the touching status data was received. Thereupon, at steps S303, S306, S309 and S312, if the CPU 32a receives non-touching status data, then the timer is stopped and reset (step S313). Moreover, if the pointer icon has changed, then it returns to the normal icon (arrow pointing in an upward and leftward direction).

Figure 10B:
Figure 10C:
Figure 10D:
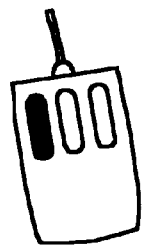

If the elapsed time period T becomes greater than the aforementioned first time period T1 (step S304), then the pointer icon changes to a first icon as illustrated in FIG. 10D (step S305). The first icon has the shape of a mouse, and is displayed in such a manner that the colour of the left switch portion thereof differs from the colour of the other portions thereof. Thereby, the user is able to identify that left click processing is to be selected if a non-touching state is assumed while the first icon is being displayed.

If the elapsed time period T becomes greater than the aforementioned second time period T2 (step S307), then the pointer icon changes to a second icon as illustrated in FIG. 10B (step S308). The second icon has an arrow shape pointing in an upward direction. Thereby, the user is able to identify that upward scroll processing is to be selected if a non-touching state is assumed while the second icon is being displayed.

Further, if the elapsed time period becomes greater than the aforementioned third time period T3 (step S310), then the pointer icon changes to a third icon as illustrated in FIG. 10C (step S311). The third icon has an arrow shape pointing in a downward direction. Thereby, the user is able to identify that downward scroll processing is to be selected if a non-touching state is assumed while the second icon is being displayed.

Figure 10E:
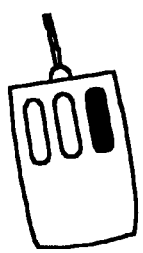
Figure 10F:
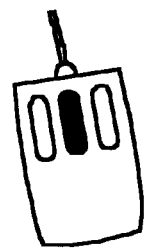

FIG. 10E shows an icon corresponding to right click processing and FIG. 10F shows an icon corresponding to middle click processing.

In the processing illustrated in FIG. 6 and FIG. 8, the touching time period T is detected on the basis of the difference between the respective timings at which the touching status data and non-touching status data is received, but as illustrated by the processing in FIG. 9 described above, the touching time period T may be detected using the timer function of the system clock.

The embodiment described above related to a case where a pen is used to make touching with a touch panel, but the invention is not limited to this. For example, the present invention may also be applied to cases where a finger is used to touching the touch panel.

According to the present invention, it is possible to switch between a plurality of mouse input operations according to the time period of touching against a touch panel. Therefore, it is possible to implement processing corresponding to a plurality of mouse input operations, selectively, by means of a single input operation, namely, a touch input operation, thereby improving ease of operation. Furthermore, it is also possible to implement, for example, upward scrolling and downward scrolling, selectively, by means of a single input operation, namely, a touch input operation, thereby improving ease of operation.

The scope of the present invention is not limited to the embodiment described above, and it also covers the inventions described in the claims of the invention and equivalent inventions.

What is claimed is:

1. An input processing method for processing touch input operations to a screen, comprising:
    detecting a touching time period for one touch against the screen; and
    selecting either a scrolling process in a first direction or a scrolling process in a second direction on the screen according to the detected touching time period for the one touch.

2. An input processing method for processing touch input operations to a screen, comprising:
    detecting a touching time period for one touch against the screen;

selecting either a process corresponding to one of mouse input operations or a screen scrolling process according to the detected touching time period for the one touch; and selecting the direction of scrolling on the screen according to the detected touching time period when the scrolling process is selected.

3. An input processing method for processing touch input operations to a screen, comprising:

detecting a touching time period for one touch against the screen, without detecting a gap between the one touch and another touch; and automatically selecting and performing either a process corresponding to one of mouse input operations or a screen scrolling process according to the detected touching time period for the one touch, without performing an additional user operation.

4. The method according to claim 3, wherein the process corresponding to one of mouse input operations is a process corresponding to a left click in the mouse input operations.

5. The method according to claim 3, further comprising:

changing an icon displayed on the screen, while the screen is being touched, each time the process selected in accordance with the touching time period changes.

6. An input processing device for processing touch input operations to a screen, comprising:

a detecting unit detecting a touching time period for one touch against the screen; and a selecting unit selecting either a scrolling process in a first direction or a scrolling process in a second direction on the screen according to the detected touching time period for the one touch.

7. An input processing device for processing touch input operations to a screen, comprising:

a detecting unit detecting a touching time period for one touch against the screen; and a selecting unit selecting either a process corresponding to one of mouse input operations or a screen scrolling process according to the detected touching time period for the one touch, wherein the selecting unit further selects the direction of scrolling on the screen according to the detected touching time period in case that the scrolling process is selected.

8. An input processing device for processing touch input operations to a screen, comprising:

a detecting unit detecting a touching time period for one touch against the screen, without detecting a gap between the one touch and another touch; and a selecting unit automatically selecting and performing either a process corresponding to one of mouse input operations or a screen scrolling process according to the detected touching time period for the one touch, without performing an additional user operation.

9. The device according to claim 8, wherein the process corresponding to one of mouse input operations is a process corresponding to a left click in the mouse input operations.

10. The device according to claim 8, further comprising:

a display controller changing an icon displayed on the screen, while the screen is being touched, each time the process selected in accordance with the touching time period changes.

11. An information processing apparatus comprising:

a display device having a screen;

a touch input device detecting touching against the screen of the display device; and an input processing device processing touch input operations to a screen, comprising, a detecting unit detecting a touching time period for one touch against the screen, and a selecting unit selecting either a scrolling process in a first direction or a scrolling process in a second direction on the screen according to the detected touching time period for the one touch.

12. An information processing apparatus comprising:

a display device having a screen;

a touch input device detecting touching against the screen of the display device; and an input processing device processing touch input operations to a screen, comprising, a detecting unit detecting a touching time period for one touch against the screen, without detecting a gap between the one touch and another touch, and a selecting unit automatically selecting and performing either a process corresponding to one of mouse input operations or a screen scrolling process according to the detected touching time period for the one touch, without performing an additional user operation.

13. A storage medium storing a program for implementing an input processing method for processing touch input operations to a screen, the program comprising:

detecting a touching time period for one touch against the screen; and selecting either a scrolling process in a first direction or a scrolling process in a second direction on the screen according to the detected touching time period for the one touch.

14. A storage medium storing a program for implementing an input processing method for processing touch input operations to a screen, the program comprising:

detecting a touching time period for one touch against the screen, without detecting a gap between the one touch and another touch; and automatically selecting and performing either a process corresponding to one of mouse input operations or a screen scrolling process according to the detected touching time period for the one touch, without performing an additional user operation.

* * * * *